United States Patent
Fujii et al.

(10) Patent No.: US 11,971,390 B2
(45) Date of Patent: Apr. 30, 2024

(54) STRETCH FLANGE CRACK EVALUATION METHOD, METAL SHEET SELECTION METHOD, PRESS DIE DESIGN METHOD, COMPONENT SHAPE DESIGN METHOD, AND PRESSED COMPONENT MANUFACTURING METHOD

(71) Applicant: JFE STEEL CORPORATION, Tokyo (JP)

(72) Inventors: Kento Fujii, Tokyo (JP); Toyohisa Shinmiya, Tokyo (JP); Yuji Yamasaki, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 461 days.

(21) Appl. No.: 17/438,302

(22) PCT Filed: Mar. 13, 2020

(86) PCT No.: PCT/JP2020/011189
§ 371 (c)(1),
(2) Date: Sep. 10, 2021

(87) PCT Pub. No.: WO2020/184712
PCT Pub. Date: Sep. 17, 2020

(65) Prior Publication Data
US 2022/0187175 A1 Jun. 16, 2022

(30) Foreign Application Priority Data
Mar. 14, 2019 (JP) .................................. 2019-047363

(51) Int. Cl.
*G01N 3/08* (2006.01)
*B21D 22/00* (2006.01)
(Continued)

(52) U.S. Cl.
CPC ............... *G01N 3/08* (2013.01); *B21D 22/00* (2013.01); *B21D 22/02* (2013.01); *G06F 30/20* (2020.01);
(Continued)

(58) Field of Classification Search
CPC .. G01N 3/08; G01N 3/30; G01N 3/32; G01N 3/34; G01N 2203/0017; G01N 2203/0062;
(Continued)

(56) References Cited

U.S. PATENT DOCUMENTS 10,467,361 B2   11/2019  Shirakami et al.
2018/0107772 A1  4/2018  Shirakami et al.
(Continued)

FOREIGN PATENT DOCUMENTS

EP  1985989 A1     10/2008
EP  2921841 A1 *   9/2015  ............. B21D 22/02
(Continued)

OTHER PUBLICATIONS

Jun. 2, 2020 International Search Report issued in International Patent Application No. PCT/JP2020/011189.
(Continued)

*Primary Examiner* — Benjamin R Schmitt
(74) *Attorney, Agent, or Firm* — Oliff PLC (57) ABSTRACT

A method includes two or more reference strain gradient information being a relationship between the strain at the hole edge and a strain gradient along a radial direction. Hole expansion forming is performed on the evaluation metal sheet under the same forming conditions as respective forming conditions corresponding to at least two pieces of the reference strain gradient information to obtain at least two limit hole expansion ratios at a hole expansion limit of the evaluation metal sheet. A formable region of the evalu-
(Continued)

ation metal sheet is obtained from the at least two pieces of the reference strain gradient information and the obtained at least two limit hole expansion ratios at the hole expansion limit. Stretch flange cracking at the sheared end face of the evaluation metal sheet is evaluated by the obtained formable region.

18 Claims, 6 Drawing Sheets

(51) Int. Cl.
  *B21D 22/02* (2006.01)
  *G06F 30/20* (2020.01)
  *G06F 30/23* (2020.01)

(52) U.S. Cl.
  CPC ..... *G06F 30/23* (2020.01); *G01N 2203/0017* (2013.01); *G01N 2203/0062* (2013.01); *G01N 2203/0075* (2013.01); *G01N 2203/0214* (2013.01); *G01N 2203/027* (2013.01)

(58) Field of Classification Search
  CPC ... G01N 2203/0075; G01N 2203/0214; G01N 2203/027; B21D 22/00; B21D 22/02; G06F 30/20; G06F 30/23
  See application file for complete search history.

(56) References Cited

U.S. PATENT DOCUMENTS

| 2018/0328826 A1* | 11/2018 | Kim | G06F 30/23 |
| 2020/0276658 A1* | 9/2020 | Fujii | G01N 3/28 |

FOREIGN PATENT DOCUMENTS

| JP | 2009-204427 A | 9/2009 |
| JP | 2010-069533 A | 4/2010 |
| JP | 2011-140046 A | 7/2011 |
| JP | 2012-170993 A | 9/2012 |
| JP | 2017-140653 A | 8/2017 |
| JP | 2019-034312 A | 3/2019 |
| WO | 2016/002880 A1 | 1/2016 |

OTHER PUBLICATIONS

Fiji Iizuka et al., "Effect of Strain Gradient on Stretch Flange Deformation Limit of Steel Sheets"; Journal of the JSTP; 2010; vol. 51.; No. 594; pp. 700-705.
Aug. 25, 2021 International Preliminary Report on Patentability issued in International Patent Application No. PCT/JP2020/011189.
Concise Statement of Relevance of Office Action issued in Japanese Patent Application No. 2020-535001.
Apr. 4, 2022 Search Report issued in European Patent Application No. 20770837.1.

* cited by examiner

STRETCH FLANGE CRACK EVALUATION METHOD, METAL SHEET SELECTION METHOD, PRESS DIE DESIGN METHOD, COMPONENT SHAPE DESIGN METHOD, AND PRESSED COMPONENT MANUFACTURING METHOD

TECHNICAL FIELD

The present invention relates to a method for evaluating stretch flange cracking at a sheared end face of a metal sheet in press forming, a method for selecting a metal sheet, a method for designing a press die, a method for designing a component shape, and a method for manufacturing a press-formed component.

BACKGROUND ART

Steel sheets used for automobile components are becoming increasingly strong, and one problem in press forming such steel sheets is stretch flange cracking. However, it has been difficult to predict stretch flange cracking at a sheared end face using a cracking prediction method such as an FLD.

Here, as described in NPL 1, it is known that a fracture limit of stretch flange cracking is significantly affected by a strain gradient in the vicinity of a fractured portion. Thus, for example, in methods described in PTL 1 to 3, a relationship between stretch flange cracking limit and strain gradient is obtained by an actual test for evaluating a stretch flange deformation limit of a sheared end face, as represented by hole expansion tests using various materials, and a forming analysis thereof. Then, stretch flange cracking is predicted on the basis of the obtained relationship between stretch flange cracking limit and strain gradient and results of the press forming analysis.

CITATION LIST

Patent Literature

PTL 1: JP 2009-204427 A
PTL 2: JP 2017-140653 A
PTL 3: WO 2016/002880

Non Patent Literature

NPL 1: Eiji Iizuka et al., Plasticity and Machining, 51-594 (2007), 700-705.

SUMMARY OF INVENTION

Technical Problem

In press forming high strength steel sheets, cracking at a sheared end face during stretch flange forming has become apparent. Therefore, in order to prevent the occurrence of stretch flange cracking, it is important to evaluate stretch flange cracking at the sheared end face of a metal sheet, particularly of a high strength steel sheet.

However, in the methods described in PTL 1 to 3, it is necessary to perform a forming analysis according to an actual test each time the metal sheet to be evaluated changes, so that it takes time to acquire analytical data on a stretch flange cracking limit.

As described in PTL 3, there is also a method for directly calculating a strain gradient from a material test. However, this test requires a special device for measuring a strain distribution in the material test. Additionally, metal sheet warping occurs during conical hole expansion forming, which makes strain measurement difficult, so that the method is not practical.

As described above, in the conventional evaluation methods, when selecting a metal sheet to be used for processing, it is necessary to perform, for each metal sheet to be evaluated, a forming analysis step for calculating a strain gradient required for predicting stretch flange cracking. Accordingly, the problem arises that it would take time to determine an index (information of a strain gradient corresponding to a metal sheet to be evaluated) for evaluating a forming limit of stretch flange cracking.

The present invention has been devised to solve the above problem, and it is an object of the present invention to provide a technology capable of more easily evaluating stretch flange cracking at the sheared end face of a metal sheet to determine press forming conditions.

It should be noted that the press forming conditions include determination of a press-formed component shape besides the selection of a metal sheet to be used for press forming.

Solution to Problem

As a result of various studies on stretch flange cracking at a sheared end face, the present inventors found that "a relationship between a strain at a hole edge and a strain gradient in a direction along a radial direction from the hole edge" obtained by performing two or more types of hole expansion forming analyses on one type of randomly selected metal sheet and converting each analyzed hole expansion ratio to true strain to use as the strain at the hole edge can be used as analytical data in evaluating a strain gradient regardless of material conditions (sheet conditions) of a metal sheet to be evaluated.

In other words, the present inventors found that the relationship between the strain at the hole edge converted to true strain from the hole expansion ratio during forming in each of the above hole expansion forming analyses and the strain gradient in the direction along the radial direction from the hole edge during the hole expansion forming is determined by an initial hole diameter of the metal sheet and a shape of a forming tool used for performing the hole expansion test, and is not affected by material strength, sheet thickness, and mechanical properties such as r-value. Thus, the present inventors found that by performing hole expansion analyses on a metal sheet having a certain mechanical property to acquire the relationship between a strain at a hole edge converted to true strain from a hole expansion ratio during forming in each of the hole expansion forming analyses and a strain gradient in a direction along a radial direction from the hole edge during the hole expansion forming, it is possible to easily acquire a relationship between a strain at the hole edge at a hole expansion limit and a strain gradient in a direction along a radial direction from the hole edge at the hole expansion limit, which is necessary for predicting stretch flange cracking, without having to perform the forming analysis for each metal sheet made of a different material each time.

Then, to solve the above problem, one aspect of the present invention is a stretch flange cracking evaluation method for evaluating stretch flange cracking of an evaluation metal sheet formed by a metal sheet with a sheared end face, the method including: including reference strain gradient information acquired by performing, under set forming conditions, a forming analysis of a hole expansion test on a second metal sheet being a metal sheet selected regardless of the evaluation metal sheet and having randomly selected sheet conditions and converting a hole expansion ratio to a strain at a hole edge composed of true strain, the reference strain gradient information being represented by a relationship between the strain at the hole edge and a strain gradient along a radial direction from the hole edge, and two or more pieces of the reference strain gradient information being included by changing the forming conditions; performing hole expansion forming on the evaluation metal sheet each under the same forming conditions as respective forming conditions corresponding to at least two pieces of the reference strain gradient information out of the two or more pieces of the reference strain gradient information to obtain at least two limit hole expansion ratios at a hole expansion limit of the evaluation metal sheet; obtaining a formable region of the evaluation metal sheet from the at least two pieces of the reference strain gradient information and the obtained at least two limit hole expansion ratios at the hole expansion limit; and evaluating stretch flange cracking at the sheared end face of the evaluation metal sheet by the obtained formable region.

Additionally, another embodiment of the present invention is a method for selecting a metal sheet to be formed into a press-formed component, the method including evaluating stretch flange cracking at a sheared end face when the metal sheet is formed into the press-formed component by the stretch flange cracking evaluation method of the above one aspect and selecting a metal sheet which causes no stretch flange cracking at the sheared end face on a basis of the evaluation.

In addition, another aspect of the present invention is a method for designing a press die for press forming a metal sheet, the method including evaluating stretch flange cracking at a sheared end face when the metal sheet is press formed by the stretch flange cracking evaluation method of the above one aspect and obtaining a press die capable of suppressing stretch flange cracking at the sheared end face on a basis of the evaluation.

Furthermore, another aspect of the present invention is a method for designing a component shape of a press-formed component obtained by press forming a metal sheet, the method including evaluating stretch flange cracking at a sheared end face when the metal sheet is pressed formed by the stretch flange cracking evaluation method of the above one aspect and obtaining a component shape which suppresses stretch flange cracking at the sheared end face on a basis of the evaluation.

Still furthermore, another aspect of the present invention is a press-formed component manufacturing method for manufacturing a press-formed component by press forming a metal sheet, the method including evaluating stretch flange cracking at a sheared end face when the metal sheet is pressed formed into the press-formed component by the stretch flange cracking evaluation method of the above one aspect.

Yet furthermore, another aspect of the present invention is a press-formed component manufacturing method for manufacturing a press-formed component by press forming a metal sheet, the method including determining press forming conditions by the stretch flange cracking evaluation method of the above one aspect.

Advantageous Effects of Invention

According to the aspect of the present invention, it is possible to more easily acquire data for evaluating (predicting) stretch flange cracking at a sheared end face.

In other words, according to the aspect of the present invention, it is possible to easily acquire data for predicting stretch flange cracking at the sheared end face of, for example, a metal sheet. Accordingly, it is possible to quickly and accurately predict whether selection of press forming conditions such as a metal sheet, a press die, and a component shape used when press forming into various components, for example, such as panel components and structural/frame components of automobiles is appropriate or not.

As a result, according to the aspect of the present invention, manufacturing of press-formed components by press forming can be performed stably, and also a great contribution can be made to decrease in defect rate of press-formed products. Additionally, the shape of a press die can be accurately predicted at a designing stage, which can contribute to shortening the time for manufacturing the press die.

DESCRIPTION OF EMBODIMENTS

Next, embodiments of the present invention will be described with reference to the drawings.

First Embodiment

Figure 1:
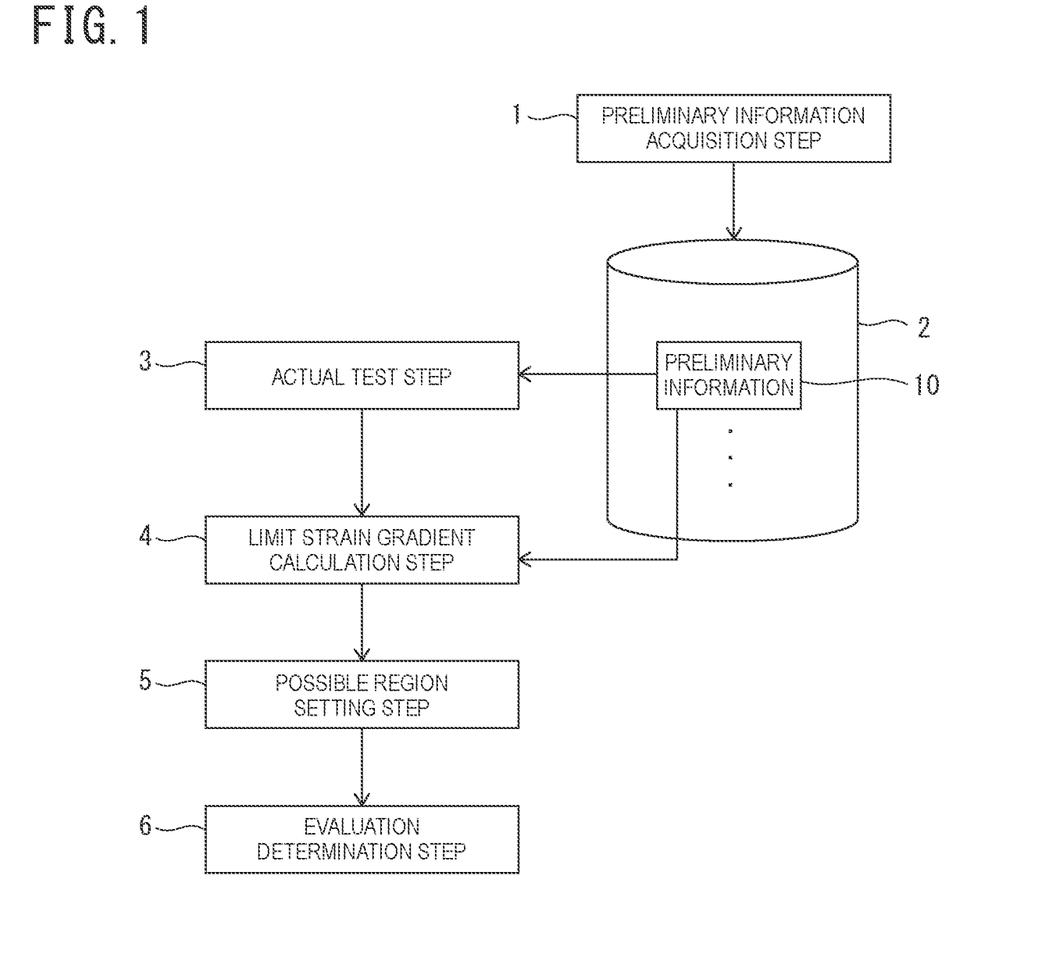
FIG. 1 is a diagram illustrating processing of a stretch flange cracking evaluation method according to an embodiment based on the present invention.

A stretch flange cracking evaluation method of the present embodiment includes, as steps of evaluating stretch flange cracking of an evaluation metal sheet formed by a metal sheet with a sheared end face due to press forming, an actual test step 3, a limit strain gradient calculation step 4, a possible region setting step 5, and an evaluation determination step 6, as illustrated in FIG. 1. In the present specification, the term "evaluation metal sheet" is also referred to as "metal sheet to be evaluated".

Additionally, preliminary information 10 for evaluating stretch flange cracking is previously stored in a database (a storage unit). The preliminary information 10 is previously acquired by performing a preliminary information acquisition step 1 and stored in the database 2.

<Preliminary Information Acquisition Step 1>

The preliminary information acquisition step 1 executes processing on a second metal sheet having the same or different sheet conditions as those of the evaluation metal sheet, specifically, on the second metal sheet having randomly selected sheet conditions regardless of the evaluation metal sheet. The preliminary information acquisition step 1 performs a forming analysis of a hole expansion test under set forming conditions (hereinafter also referred to as hole expansion test conditions) on the randomly selected second metal sheet.

The sheet conditions are usually characteristic conditions of the metal sheet set when analyzing the metal sheet. Examples of the sheet conditions include material strength, sheet mechanical properties, sheet thickness, and the like. The sheet conditions of the second metal sheet to be subjected to the forming analysis are not particularly limited. However, for example, randomly selected sheet conditions may be employed from among sheet conditions of a plurality of types of metal sheets that are assumed to be used as the evaluation metal sheet. In other words, the sheet conditions of the second metal sheet to be subjected to the forming analysis can be randomly selected and used regardless of the sheet conditions (such as mechanical properties and sheet thickness) of the evaluation metal sheet. Therefore, the sheet conditions of the second metal sheet to be subjected to the forming analysis are usually those different from the sheet conditions of the evaluation metal sheet.

In this forming analysis, a relationship between a hole expansion ratio and a strain gradient along a radial direction from a hole edge is obtained. Additionally, in the preliminary information acquisition step 1, the hole expansion ratio during the forming analysis is converted to true strain and used as a strain at the hole edge. The preliminary information acquisition step 1 executes processing for obtaining reference strain gradient information, which includes the relationship between the strain at the hole edge and the strain gradient, corresponding to the forming conditions set in the hole expansion test by the above processing. The processing in the preliminary information acquisition step 1 is performed twice or more times with different hole expansion test conditions. The sheet conditions of the second metal sheet to be subjected to the forming analysis may be different or the same depending on the hole expansion test conditions. As the sheet conditions of the second metal sheet, sheet conditions that facilitate the forming analysis may be set as appropriate.

This results in the acquisition of two or more data of the preliminary information 10 including the forming conditions (hole expansion test conditions) and the reference strain gradient information, and the acquired two or more data of the preliminary information 10 are stored in the database 2.

Note that the forming conditions are represented by two types of variables: an initial hole diameter formed in the metal sheet and the shape of a forming tool (the shape of a punch) for use in performing the hole expansion test. Two or more forming conditions in which at least one of the initial hole diameter or the forming tool shape is changed are set as the hole expansion test conditions.

Figure 2:
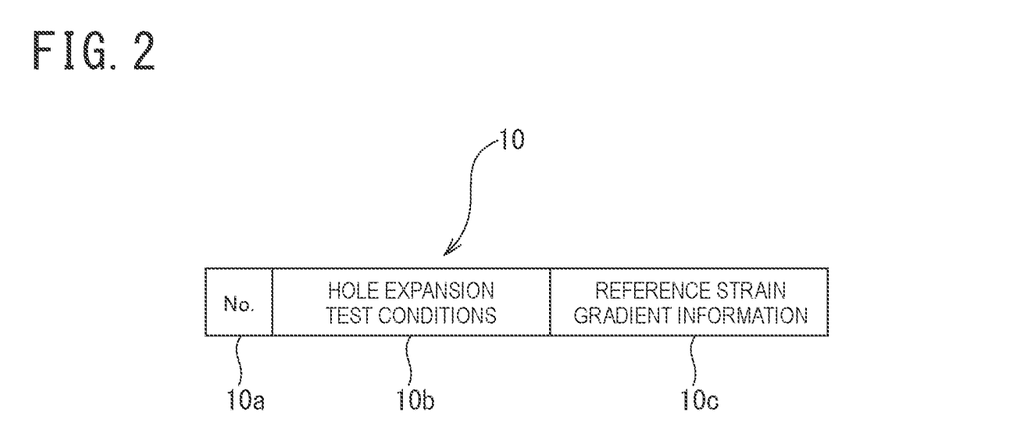
FIG. 2 is a diagram illustrating a data example of preliminary information.
Figure 3:
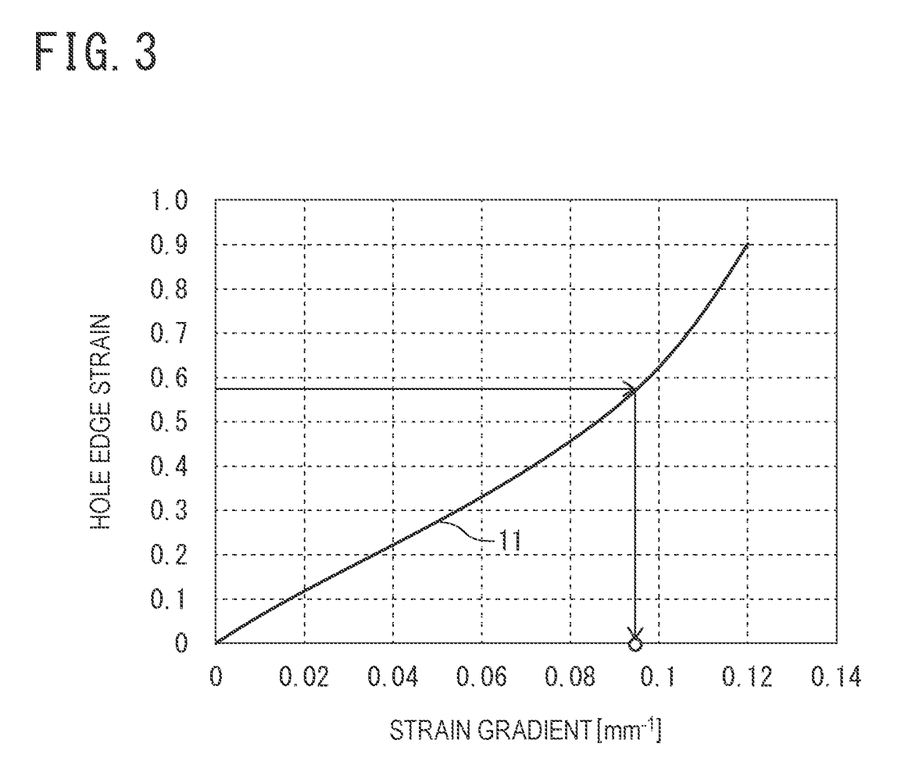
FIG. 3 is a diagram illustrating processing of the stretch flange cracking evaluation method.

The data of the preliminary information 10 stored in the database 2 has a data format, for example, as illustrated in FIG. 2. In an example illustrated in FIG. 2, the data of the preliminary information 10 includes a data number 10*a*, forming conditions 10*b* for specifying the hole expansion test conditions, and reference strain gradient information 10*c* corresponding to the forming conditions. The reference strain gradient information 10*c* is information of "the relationship between the hole expansion ratio and the strain gradient along the radial direction from the hole edge" represented by a graph 11 as illustrated in FIGS. 3 and 4. The reference strain gradient information 10*c* includes, for example, a conversion formula that expresses the above relationship, two or more pieces of table information including each data of (the hole expansion ratio, the strain gradient along the radial direction from the hole edge), and the like.

Figure 5A:
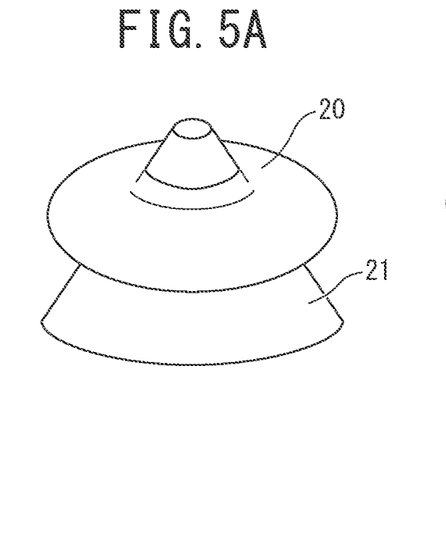
FIG. 5 is a diagram illustrating examples of a forming tool.
Figure 5B:
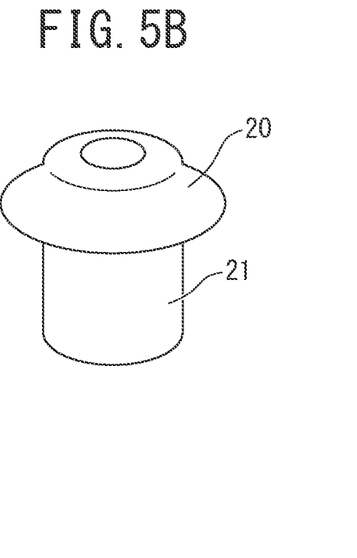

Here, since the above-described strain gradient affects stretch flange deformation limit, it is preferable to acquire a stretch flange deformation limit in a wide strain gradient. To do that, it is better to obtain the reference strain gradient information 10*c* by variously changing the initial hole diameter and dimensions of the forming tool with respect to the metal sheet. Usually, in various hole expansion tests, when forming in the hole expansion tests using forming tools (punches) having the same shape, the smaller the initial hole diameter of the metal sheet, the larger the strain gradient in the radial direction of a hole from a hole edge during the forming at the same hole expansion ratio in the various hole expansion tests. Additionally, the shape of the forming tool also affects the strain gradient. With respect to the initial hole diameter of the same metal sheet, when the shape of the forming tool is conical (see FIG. 5A), the strain gradient tends to be large, whereas when the shape of the forming tool is cylindrical (see FIG. 5B), the strain gradient tends to be small.

To improve the accuracy of prediction of the stretch flange cracking at the sheared end face in the present embodiment, it is preferable to perform the forming analysis and the forming test under as many types of forming conditions as possible. However, when considering a metal sheet for use in an actual test, the initial hole diameter to be formed in the metal sheet is preferably from 5 mm to 200 mm. when the initial hole diameter is less than 5 mm, a punching and forming tool is easily deformed during punching processing of the metal sheet that will be described later, due to which no hole edge in a uniform sheared state can be obtained, and therefore experimental accuracy decreases. Additionally, when the initial hole diameter is more than 100 mm, a normal forming tool for punching the hole diameter is also large, and accordingly, equipment using the punching and forming tool also becomes large, which is therefore not practical. More preferably, the initial hole diameter of the metal sheet is from 10 mm to 50 mm.

The shape of the forming tool may include a conical shape, a cylindrical shape, a spherical shape, and the like. However, the shape of the forming tool can be any shape that allows forming states with various strain gradients to be reproduced in the forming analysis and allows actual tests to be performed under the same forming conditions. As for the shape of the forming tool, it is preferable to use a conical forming tool having a punch tip angle of 60° defined in Japanese Industrial Standard JIS Z 2256.

In the forming analysis of hole expansion in the preliminary information acquisition step 1, an analysis that reproduces forming conditions determined in consideration of the above description is performed.

As a method for the forming analysis, a widely employed finite element method is preferably used. However, the method for the forming analysis to be employed can be any forming analysis method that allows for reproduction of the forming conditions in the analysis and allows for acquisition of a strain of the metal sheet during the forming. The following description is an example using a finite element analysis.

The forming analysis of the hole expansion test allows for acquisition of a strain distribution that is largest at the hole edge and decreases as a distance from the hole edge increases in the radial direction in any forming state. Then, the strain gradient is calculated from the strain distribution. Although the definition of the strain varies, the strain to be used is preferably a strain that strongly reflects a circumferential strain of the hole. Examples of such a strain include a maximum principal strain and an equivalent plastic strain, but preferred is the maximum principal strain.

Converting the hole expansion ratio to the strain at the hole edge in terms of true strain and using it suppresses the dependence of the reference strain gradient information 10c including the relationship between the strain at the hole edge and the strain gradient on material properties of the metal sheet.

Specifically, according to the findings obtained by the present inventors, the relationship between the strain at the hole edge converted to true strain from the hole expansion ratio during the forming in the hole expansion forming analysis and the strain gradient in the direction along the radial direction from the hole edge during the hole expansion forming analysis is determined by the initial hole diameter of the metal sheet and the shape of the forming tool for use in performing the hole expansion test, and is not affected by material strength, sheet thickness, and mechanical properties of the material, such as r-value. Then, according to the findings obtained by the present inventors, by performing a hole expansion forming analysis of a metal sheet having a certain mechanical property and obtaining the relationship between a strain at a hole edge converted to true strain from a hole expansion ratio during forming in the hole expansion forming analysis and a strain gradient in a direction along a radial direction from the hole edge during the hole expansion forming, the relationship between the strain at the hole edge at a hole expansion limit and the strain gradient in the direction along the radial direction from the hole edge at the hole expansion limit, which is necessary for predicting stretch flange cracking, can be easily obtained without having to perform the forming analysis of different materials each time.

FIG. 4 illustrates examples of the graph 11 of the reference strain gradient information 10c. Initial hole diameters and punch shapes used as a forming tool shape 21 applied in the examples are given in Tables 1 and 2 and FIG. 5. In FIG. 5, reference sign 20 denotes a metal sheet. Note the graph of the reference strain gradient information 10c is also referred to as master curve.

TABLE 1

| Initial hole | Conical punch | |
|---|---|---|
| diameter [mm] | Tip angle [°] | Outline [mm] |
| 10 | 60 | 50 |
| 25 | | 98 |
| 50 | | 140 |

TABLE 2

| Initial | Cylindrical punch | |
|---|---|---|
| hole diameter [mm] | Shoulder radius [mm] | Outline [mm] |
| 25 | 5 | 50 |
| 50 | 10 | 100 |

Figure 4A:
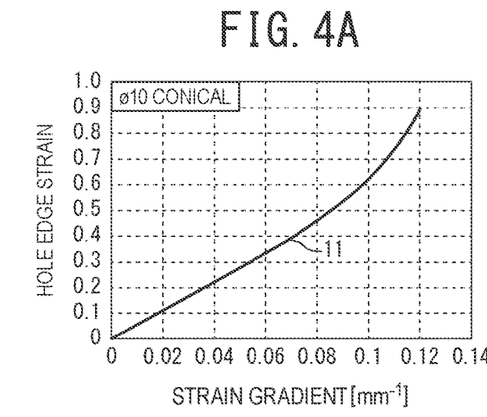
FIG. 4 is a diagram illustrating examples of reference strain gradient information.
Figure 4B:
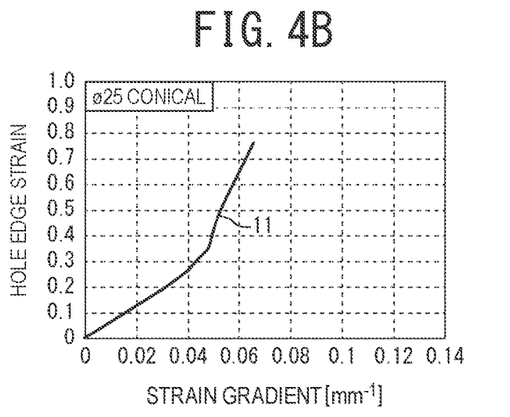
Figure 4C:
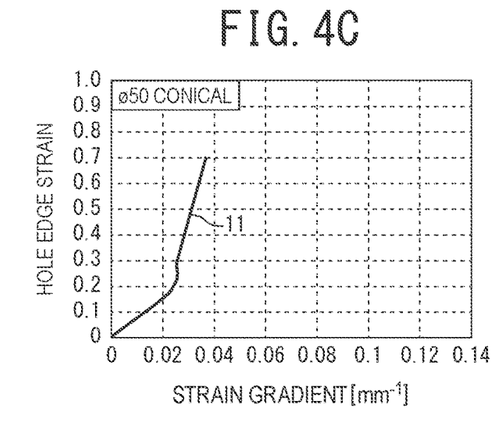
Figure 4D:
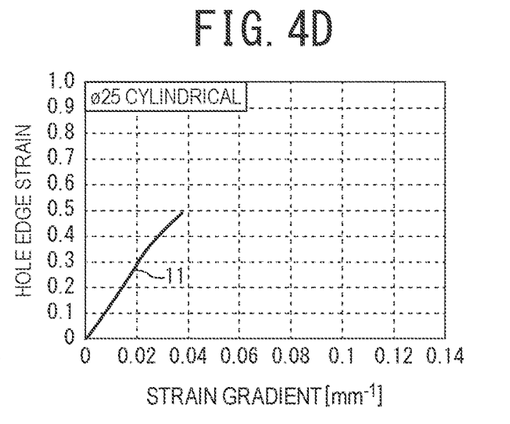
Figure 4E:
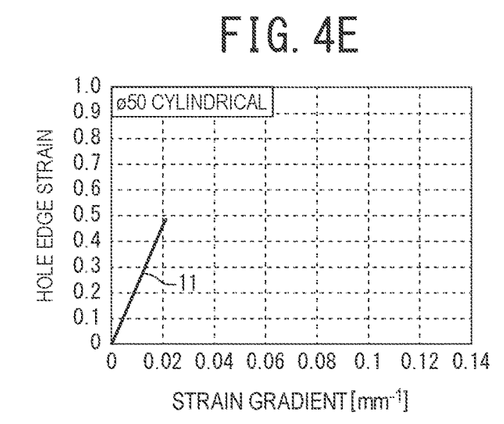

FIG. 4A is a graph of the reference strain gradient information 10c when analyzed under hole expansion test conditions where the initial hole diameter was 10 mm ø and the forming tool shape 21 was conical. FIG. 4B is a graph of the reference strain gradient information 10c when analyzed under hole expansion test conditions where the initial hole diameter was 25 mm ø and the forming tool shape 21 was conical. FIG. 4C is a graph of the reference strain gradient information 10c when analyzed under hole expansion test conditions where the initial hole diameter was 50 mm ø and the forming tool shape 21 was conical. FIG. 4D is a graph of the reference strain gradient information 10c when analyzed under hole expansion test conditions where the initial hole diameter was 25 mm ø and the forming tool shape 21 was cylindrical. FIG. 4E is a graph of the reference strain gradient information 10c when analyzed under hole expansion test conditions where the initial hole diameter was 50 mm and the forming tool shape 21 was cylindrical.

In this way, by changing the forming condition of at least one of the initial hole diameter or the forming tool shape, reference strain gradient information 10c represented by the different graphs 11 can be obtained.

Here, the present inventors used four steel types of metal sheets having tensile strengths of 270 MPa, 590 MPa, 980 MPa, and 1470 MPa to obtain the reference strain gradient information 10c for each metal sheet when analyzed under hole expansion test conditions where the initial hole diameter was 10 mm ø and the forming tool shape was conical. In this case, at least, when the strain gradient was 0.1 mm$^1$ or less, the reference strain gradient information 10c was confirmed to have the same curve. Additionally, even when analyzed by changing only the r value, the reference strain gradient information 10c was confirmed to have substantially the same curve (master curve) when the strain gradient was 0.1 mm$^1$ or less. Furthermore, even when confirmed by changing the sheet thickness in a range of from 0.5 mm to 4.0 mm, the reference strain gradient information 10c was confirmed to have substantially the same curve when the strain gradient was 0.1 mm$^1$ or less.

Here, in the finite element analysis, the reference strain gradient information 10c is preferably obtained by making sure that there is no excessive deformation in some of the finite elements.

From such a perspective, when obtaining the reference strain gradient information 10c, it is preferable to analyze an equivalent stress-equivalent plastic strain relationship of the second metal sheet used for the forming analysis of the hole expansion test under a condition where the material properties are soft, for example, as in the relationship obtained by a uniaxial tensile test using a metal sheet having a uniform elongation of 7.5% or more. Then, preferably, the equivalent stress-equivalent plastic strain relationship obtained from the uniaxial tensile test of the second metal sheet or an approximate formula thereof is used for the forming analysis.

<Actual Test Step 3>

In the actual test step 3, hole expansion forming is actually performed on a metal sheet made of the same material as that of the evaluation metal sheet under the same forming conditions as forming conditions (hole expansion test conditions) corresponding to first reference strain gradient information selected from among the plurality of pieces of reference strain gradient information 10c stored in the database 2 to obtain a limit hole expansion ratio at the hole expansion limit of the evaluation metal sheet.

<Limit Strain Gradient Calculation Step 4>

In the limit strain gradient calculation step 4, on a basis of the first reference strain gradient information stored in the database 2 and a limit strain that is the strain at the hole edge at the hole expansion limit corresponding to the limit hole expansion ratio obtained in the actual test step 3, a strain gradient along the radial direction from the hole edge corresponding to the limit strain is calculated. In other words, in the limit strain gradient calculation step 4, the reference strain gradient information 10c corresponding to the hole expansion test conditions employed in the actual test step 3 is referenced to obtain the strain gradient corresponding to the strain at the hole edge converted from the limit hole expansion ratio obtained in the actual test step 3, as in FIG. 3, and acquire data of (hole edge strain, strain gradient) at the limit strain. The example of FIG. 3 is an example where a hole expansion ratio of 79% at the limit strain was converted to a hole edge strain of 0.58, and a strain gradient of 0.095 corresponding to the hole edge strain of 0.58 was obtained from the graph 11 of the corresponding reference strain gradient information 10c.

The processing of the actual test step 3 and the limit strain gradient calculation step 4 above are performed twice or more by changing the hole expansion test conditions stored in the database 2. As a result, two or more data of (hole edge strain, strain gradient) corresponding to the limit strain are acquired.

<Possible Region Setting Step 5>

Figure 6:
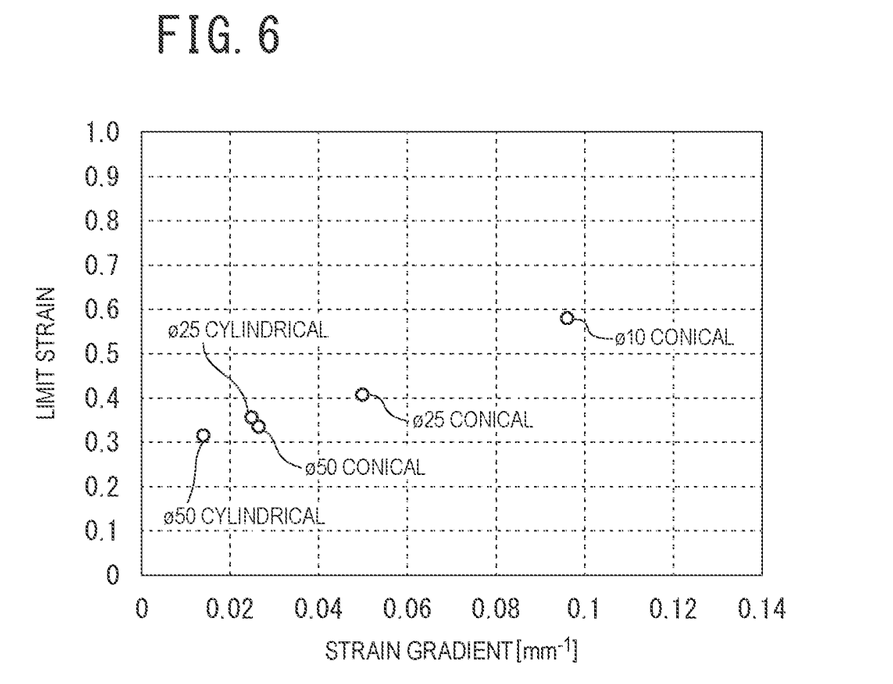
FIG. 6 is a diagram illustrating processing of a possible region setting step.
Figure 7:
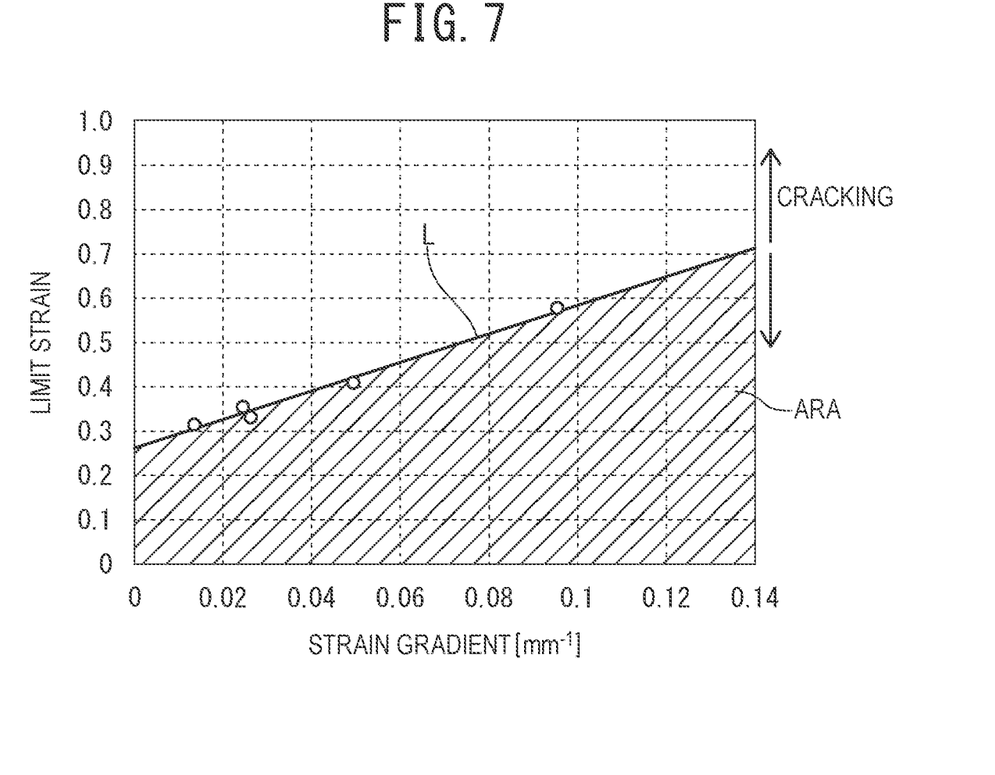
FIG. 7 is a diagram illustrating processing of the possible region setting step.

In the possible region setting step 5, a formable region ARA as in FIG. 7 is obtained from the two or more sets of the data (see FIG. 6) of (hole edge strain, strain gradient) at the limit strain obtained by performing twice or more times by changing the data of (hole expansion test conditions, reference strain gradient information 10c). The hole edge strain corresponds to limit strain data.

For example, positions of the two or more sets of (hole edge strain, strain gradient) obtained in the limit strain gradient calculation step 4 are set as boundary values of the formable region ARA, and a line passing through the two or more sets of (hole edge strain, strain gradient) is defined as a forming limit line L, and a region under the line is defined as the formable region ARA.

<Evaluation Determination Step 6>

In the evaluation determination step 6, stretch flange cracking at the sheared end face of the metal sheet to be evaluated is evaluated by the formable region ARA obtained in the possible region setting step 5. In the evaluation determination step 6, for example, a forming analysis that simulates press forming to be evaluated is performed, and stretch flange cracking is evaluated by whether or not a relationship between strain at an edge of the metal sheet to be evaluated and strain gradient in a direction inward of the metal sheet to be evaluated from the edge in the press forming analysis is present in the formable region ARA. When the data is in the formable region ARA, it is predicted that no stretch flange cracking will occur at the sheared end face.

<Effects and Others>

As described in NPL 1, the deformation limit in stretch flange forming is affected by the strain gradient in the vicinity of the edge. This is because when the strain gradient becomes large, even if the edge reaches a strain localization condition, the inside thereof does not reach the condition, so that a strain localization suppressing effect works, and a neck growth suppressing effect in a region with less strain increases. In other words, for the two reasons that the deformation limit of the material expands, and the uniformity of the strain distribution at the hole edge increases, the larger the strain gradient, the larger the deformation limit of stretch flange forming.

According to the present embodiment, a hole expansion forming analysis is performed on one type of randomly selected metal sheet to previously acquire the relationship between a strain at a hole edge converted to true strain from a hole expansion ratio during forming in the forming analysis and a strain gradient in a direction along a radial direction from the hole edge at the hole expansion ratio. Then, in the present embodiment, using the same initial hole diameter and the same forming tool as those in the forming analysis, an actual hole expansion test is performed to acquire a limit hole expansion ratio at a hole expansion limit and calculate a value of the strain gradient at the hole expansion limit from the relationship between the strain at the hole edge during the forming and the strain gradient in the direction along the radial direction from the hole edge at the time of the forming. In the same manner, the formable region ARA of the stretch flange forming is determined from the relationship between a strain at a hole edge at a hole expansion limit and a strain gradient in the direction along the radial direction from the hole edge at the hole expansion limit in at least two or more types of hole expansion tests.

Then, a forming analysis simulating press forming is performed, and the determined formable region ARA of the stretch flange forming is compared to the relationship between a strain at the edge of an evaluation metal sheet in the press forming analysis and a strain gradient in a direction inward from the edge of the evaluation metal sheet. When a deformation state of the edge in the press forming analysis is in the above formable region ARA, it is predicted that stretch flange cracking will be suppressed. In other words, it is possible to determine whether or not the evaluation metal sheet can be formed during press forming.

By using the strain at the hole edge converted to true strain from the hole expansion ratio when obtaining the reference strain gradient information 10c, the relationship between the strain at the hole edge and the strain gradient in the direction along the radial direction from the hole edge is determined by the initial hole diameter of the metal sheet and the forming tool shape for performing the hole expansion test, and is not affected by material strength, sheet thickness, and mechanical properties such as r-value. As a result, in the present embodiment, the relationship between a strain at the hole edge at a hole expansion limit and a strain gradient in the direction along the radial direction from the hole edge at the hole expansion limit, which is necessary for predicting stretch flange cracking, can be more easily acquired without having to perform the forming analysis for each of evaluation metal sheets made of different materials.

From the above, the present embodiment allows for easy acquisition of data for predicting stretch flange cracking at a sheared end face.

Thus, according to the present embodiment, since the data for predicting stretch flange cracking at the sheared end face of a metal sheet to be evaluated can be easily obtained, it is possible to quickly and accurately predict whether the selection of a metal sheet used for press forming various components such as panel components and structural/frame components of automobiles is appropriate. As a result, according to the present embodiment, stable press forming can be performed, as well as a great contribution can be made to decrease in defect rate of press-formed products. Additionally, the shape of a press die can be accurately predicted at the designing stage, which can contribute to shortening the time for manufacturing the press die.

Second Embodiment

In the second embodiment, stretch flange cracking is easily evaluated by the stretch flange cracking evaluation method described in the first embodiment, and the selection of press forming conditions and design change are executed on the basis of the evaluation.

Examples of the press forming conditions include the selection of a metal sheet for use in press forming, the selection of a forming surface of a die for use in press forming, and the determination of a press-formed component to be manufactured.

For example, the present embodiment executes, when selecting a metal sheet to be formed into a press-formed component, evaluating stretch flange cracking at a sheared end face when the metal sheet is formed into the press-formed component by the stretch flange cracking evaluation method described in the first embodiment and selecting a metal sheet which causes no stretch flange cracking at a sheared end face on the basis of the evaluation.

Additionally, for example, when designing a press die for press forming a metal sheet, the present embodiment executes evaluating stretch flange cracking at a sheared end face when the metal sheet is press formed by the stretch flange cracking evaluation method described in the first embodiment and obtaining a press die capable of suppressing stretch flange cracking at the sheared end face on the basis of the evaluation.

In addition, for example, when designing a component shape of a press-formed component obtained by press forming a metal sheet, the present embodiment executes evaluating stretch flange cracking at a sheared end face when the metal sheet is press formed by the stretch flange cracking evaluation method described in the first embodiment and obtaining a component shape which suppresses stretch flange cracking at the sheared end face on the basis of the evaluation.

Furthermore, for example, in the manufacturing of a press-formed component in which a metal sheet is press formed to manufacture the press-formed component, the present embodiment executes evaluating stretch flange cracking at a sheared end face when the metal sheet is press formed into the press-formed component by the stretch flange cracking evaluation method described in the first embodiment.

Still furthermore, for example, in the manufacturing of a press-formed component in which a metal sheet is press formed to manufacture the press-formed component, the present embodiment executes determining press forming conditions by the stretch flange cracking evaluation method described in the first embodiment.

According to the present embodiment, for example, it is possible to quickly and accurately predict whether the selection of press forming conditions including a metal sheet, a press die, and a component shape used, for example, when press forming into various components such as panel components and structural/frame components of automobiles is appropriate or not.

As a result, according to the aspects of the present invention, manufacturing of a press-formed component by press forming can be stably performed, as well as a great contribution can be made to decrease in defect rate of press-formed products. Additionally, the shape of the press die can be accurately predicted at the designing stage, which can contribute to shortening the time for manufacturing the press die.

EXAMPLE

Figure 8:
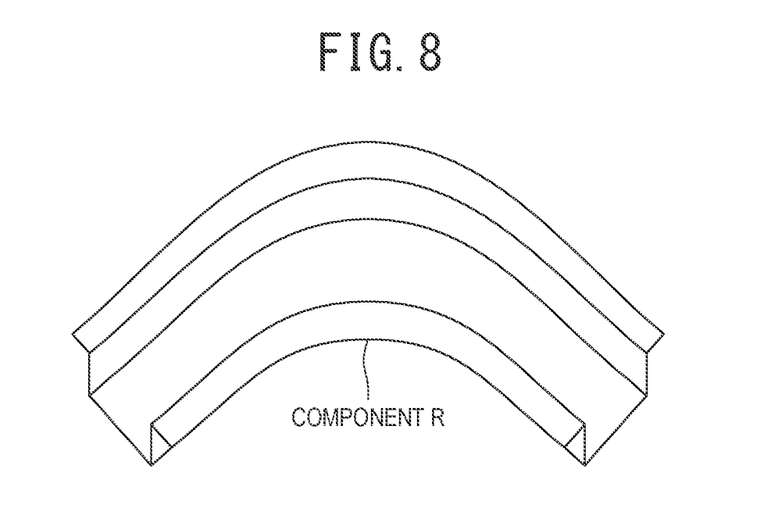
FIG. 8 is a diagram illustrating the shape of a press-formed component R in an Example.

An evaluation was performed on a case where a metal sheet made of a sheet material given in Table 3 was press-formed into a curved press-formed component R as illustrated in FIG. 8.

TABLE 3

| Yield stress YS [MPa] | Tensile strength TS [MPa] | Elongation El [%] | Sheet thickness [mm] |
|---|---|---|---|
| 804 | 998 | 17 | 1.4 |

Hole expansion tests were performed on the metal sheet made of the sheet material given in Table 3 under the initial hole diameter and press tool conditions given in Tables 1 and 2 to acquire limit hole expansion ratios as given in Table 4. Hole edge strains in terms of true strain were obtained from the limit hole expansion ratios, and strain gradients were acquired from the graphs (master curves) illustrated in FIG. 4 by the method described in the present embodiment. Table 4 shows the results.

TABLE 4

| Hole expansion forming conditions | | Limit hole expansion ratio [%] obtained by hole expansion test | Hole edge strain in terms of true strain obtained from limit hole expansion ratio | Strain gradient [mm$^{-1}$] obtained from master curve [FIG. 4] |
|---|---|---|---|---|
| Initial hole diameter (mm) | Tool shape | | | |
| 10 | Conical tip angle 60° | 61 | 0.48 | 0.083 |
| 25 | | 43 | 0.36 | 0.048 |
| 50 | | 38 | 0.32 | 0.026 |
| 25 | Cylindrical shoulder Radius 5 mm Outer diameter 50 mm | 29 | 0.26 | 0.018 |
| 50 | Cylindrical shoulder Radius 10 mm Outer diameter 100 mm | 30 | 0.26 | 0.011 |

Figure 9:
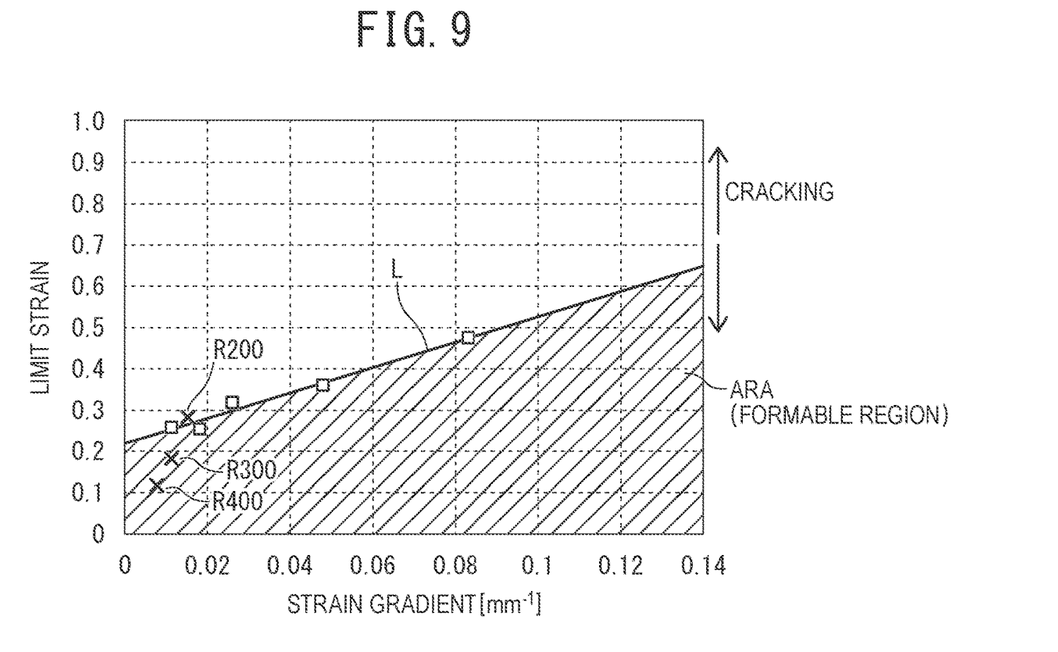
FIG. 9 is a diagram illustrating evaluation by the Example.

The forming limit line L and the formable region ARA were obtained from the hole edge strains and the strain gradients illustrated in FIG. 4, and the results are illustrated in FIG. 9.

A forming analysis simulating press forming was performed for each component shape in which the curvature radius of a curve along a longitudinal direction of the press-formed component R was changed. Then, there were obtained a strain at an edge of a metal sheet to be evaluated and a strain gradient in a direction inward from the edge of the metal sheet to be evaluated in the press forming analysis, and it was confirmed whether or not they were positioned in the formable region ARA illustrated in FIG. 9. From the results of the confirmation, the forming analysis predicted that no stretch flange cracking would occur at curvature radii of 300 mm and 400 mm, and stretch flange cracking would occur at a curvature radius of 200 mm or less.

On the other hand, when press forming tests were actually performed by changing the curvature radius of the curve along the longitudinal direction of the press-formed component R, no stretch flange cracking occurred at the curvature radii of 300 mm and 400 mm, and stretch flange cracking occurred at the curvature radius of 200 mm or less.

From the evaluation results of the Example, it can be evaluated that the curvature radius of the curve along the longitudinal direction of the press-formed component R needs to be 300 mm or more.

Thus, the stretch flange cracking evaluation based on the present invention is consistent with the results in the actual press forming, which can confirm that the prediction of stretch flange cracking can be accurately evaluated by the stretch flange cracking evaluation method based on the present invention.

Here, the entire content of Japanese Patent Application No. 2019-047363 (filed on Mar. 14, 2019) to which the present application claims priority forms a part of the present disclosure by reference. Although the present invention has been described with reference to a limited number of embodiments, the scope of rights of the present invention is not intended to be limited thereto, and modifications of each embodiment based on the above disclosure will be obvious to those skilled in the art.

REFERENCE SIGNS LIST

1: Preliminary information acquisition step
2: Database
3: Actual test step
4: Limit strain gradient calculation step
5: Possible region setting step
6: Evaluation determination step
10: Preliminary information
10a: Data number
10b: Forming conditions
10c: Reference strain gradient information
ARA: Formable region

The invention claimed is:

1. A stretch flange cracking evaluation method for evaluating stretch flange cracking of an evaluation metal sheet formed by a metal sheet with a sheared end face, the stretch flange cracking evaluation method comprising:
  including reference strain gradient information acquired by performing, under set forming conditions, a forming analysis of a hole expansion test on a second metal sheet being a metal sheet selected regardless of the evaluation metal sheet and having randomly selected sheet conditions and converting a hole expansion ratio to a strain at a hole edge composed of true strain, the reference strain gradient information being represented by a relationship between the strain at the hole edge and a strain gradient along a radial direction from the hole edge, and two or more pieces of the reference strain gradient information being included by changing the forming conditions;
  performing hole expansion forming on the evaluation metal sheet each under the same forming conditions as respective forming conditions corresponding to at least two pieces of the reference strain gradient information out of the two or more pieces of the reference strain gradient information to obtain at least two limit hole expansion ratios at a hole expansion limit of the evaluation metal sheet;
  obtaining a formable region of the evaluation metal sheet from the at least two pieces of the reference strain gradient information and the obtained at least two limit hole expansion ratios at the hole expansion limit; and
  evaluating stretch flange cracking at the sheared end face of the evaluation metal sheet by the obtained formable region.

2. The stretch flange cracking evaluation method according to claim 1, wherein the sheet conditions are at least either mechanical properties or a sheet thickness of the second metal sheet.

3. The stretch flange cracking evaluation method according to claim 1, wherein the evaluation by the formable region is determined by performing a forming analysis simulating press forming and depending on whether or not a relationship between a strain at an edge of the evaluation metal sheet and a strain gradient in a direction inward from the edge of the evaluation metal sheet in the forming analysis is present in the formable region.

4. The stretch flange cracking evaluation method according to claim 1, wherein when obtaining the reference strain gradient information, an equivalent stress-equivalent plastic strain relationship of the second metal sheet for use in the forming analysis of the hole expansion test is acquired from a uniaxial tensile test of a metal sheet having a uniform elongation of 7.5% or more, and the equivalent stress-equivalent plastic strain relationship obtained from the uniaxial tensile test of the second metal sheet or an approximate formula of the equivalent stress-equivalent plastic strain relationship is used in the forming analysis.

5. A method for selecting a metal sheet to be formed into a press-formed component, the metal sheet selection method comprising evaluating stretch flange cracking at a sheared end face when the metal sheet is formed into the press-formed component by the stretch flange cracking evaluation method according to claim 1 and selecting a metal sheet which causes no stretch flange cracking at the sheared end face on a basis of the evaluation.

6. A method for designing a press die for press forming a metal sheet, the press die designing method comprising evaluating stretch flange cracking at a sheared end face when the metal sheet is press formed by the stretch flange cracking evaluation method according to claim 1 and obtaining a press die capable of suppressing stretch flange cracking at the sheared end face on a basis of the evaluation.

7. A method for designing a component shape of a press-formed component obtained by press forming a metal sheet, the component shape designing method comprising evaluating stretch flange cracking at a sheared end face when the metal sheet is press formed by the stretch flange cracking evaluation method according to claim 1 and obtaining a component shape which suppresses stretch flange cracking at the sheared end face on a basis of the evaluation.

8. A press-formed component manufacturing method for manufacturing a press-formed component by press forming a metal sheet, the press-formed component manufacturing method comprising evaluating stretch flange cracking at a sheared end face when the metal sheet is press formed into the press-formed component by the stretch flange cracking evaluation method according to claim 1.

9. A press-formed component manufacturing method for manufacturing a press-formed component by press forming a metal sheet, the press-formed component manufacturing method comprising determining press forming conditions by the stretch flange cracking evaluation method according to claim 1.

10. A stretch flange cracking evaluation method for evaluating stretch flange cracking of an evaluation metal sheet formed by a metal sheet with a sheared end face, the stretch flange cracking evaluation method comprising:
  including a storage unit configured to store reference strain gradient information acquired by performing, under set forming conditions, a forming analysis of a hole expansion test on a second metal sheet being a metal sheet selected regardless of the evaluation metal sheet and having randomly selected sheet conditions and converting a hole expansion ratio to a strain at a hole edge composed of true strain, the reference strain gradient information being represented by a relationship between the strain at the hole edge and a strain gradient along a radial direction from the hole edge and being linked to the forming conditions and stored in the storage unit, in which the storage unit stores two or more pieces of the reference strain gradient information with the forming conditions being different, and comprising as steps of evaluating stretch flange cracking of the evaluation metal sheet:

an actual test step of performing hole expansion forming on the evaluation metal sheet under the same forming conditions as forming conditions corresponding to first reference strain gradient information selected from the plurality of pieces of the reference strain gradient information stored in the storage unit to obtain a limit hole expansion ratio at a hole expansion limit of the evaluation metal sheet;

a limit strain gradient calculation step of, on a basis of the first reference strain gradient information and a limit strain being a strain at the hole edge at the hole expansion limit corresponding to the limit hole expansion ratio obtained in the actual test step, calculating a strain gradient along the radial direction from the hole edge corresponding to the limit strain; and a possible region setting step of obtaining a formable region from two or more sets of data (the limit strain and the strain gradient) obtained by performing the actual test step and the limit strain gradient calculation step twice or more times by changing the reference strain gradient information, wherein the stretch flange cracking at the sheared end face of the evaluation metal sheet is evaluated by the formable region obtained by the possible region setting step.

11. The stretch flange cracking evaluation method according to claim 10, wherein the sheet conditions are at least either mechanical properties or a sheet thickness of the second metal sheet.

12. The stretch flange cracking evaluation method according to claim 10, wherein the evaluation by the formable region is determined by performing a forming analysis simulating press forming and depending on whether or not a relationship between a strain at an edge of the evaluation metal sheet and a strain gradient in a direction inward from the edge of the evaluation metal sheet in the forming analysis is present in the formable region.

13. The stretch flange cracking evaluation method according to claim 10, wherein when obtaining the reference strain gradient information, an equivalent stress-equivalent plastic strain relationship of the second metal sheet for use in the forming analysis of the hole expansion test is acquired from a uniaxial tensile test of a metal sheet having a uniform elongation of 7.5% or more, and the equivalent stress-equivalent plastic strain relationship obtained from the uniaxial tensile test of the second metal sheet or an approximate formula of the equivalent stress-equivalent plastic strain relationship is used in the forming analysis.

14. A method for selecting a metal sheet to be formed into a press-formed component, the metal sheet selection method comprising evaluating stretch flange cracking at a sheared end face when the metal sheet is formed into the press-formed component by the stretch flange cracking evaluation method according to claim 2 and selecting a metal sheet which causes no stretch flange cracking at the sheared end face on a basis of the evaluation.

15. A method for designing a press die for press forming a metal sheet, the press die designing method comprising evaluating stretch flange cracking at a sheared end face when the metal sheet is press formed by the stretch flange cracking evaluation method according to claim 10 and obtaining a press die capable of suppressing stretch flange cracking at the sheared end face on a basis of the evaluation.

16. A method for designing a component shape of a press-formed component obtained by press forming a metal sheet, the component shape designing method comprising evaluating stretch flange cracking at a sheared end face when the metal sheet is press formed by the stretch flange cracking evaluation method according to claim 10 and obtaining a component shape which suppresses stretch flange cracking at the sheared end face on a basis of the evaluation.

17. A press-formed component manufacturing method for manufacturing a press-formed component by press forming a metal sheet, the press-formed component manufacturing method comprising evaluating stretch flange cracking at a sheared end face when the metal sheet is press formed into the press-formed component by the stretch flange cracking evaluation method according to claim 10.

18. A press-formed component manufacturing method for manufacturing a press-formed component by press forming a metal sheet, the press-formed component manufacturing method comprising determining press forming conditions by the stretch flange cracking evaluation method according to claim 10.

* * * * *